United States Patent Office 3,182,860
Patented May 11, 1965

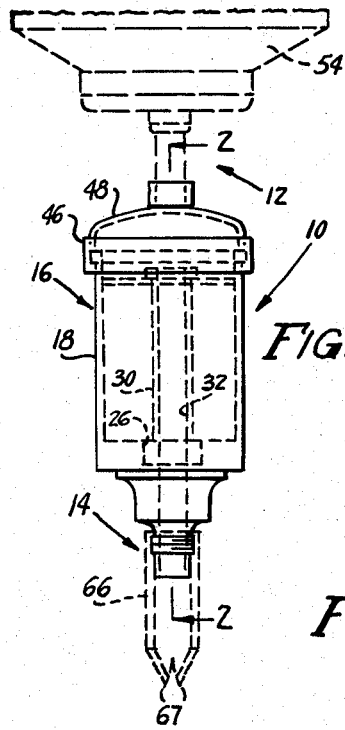
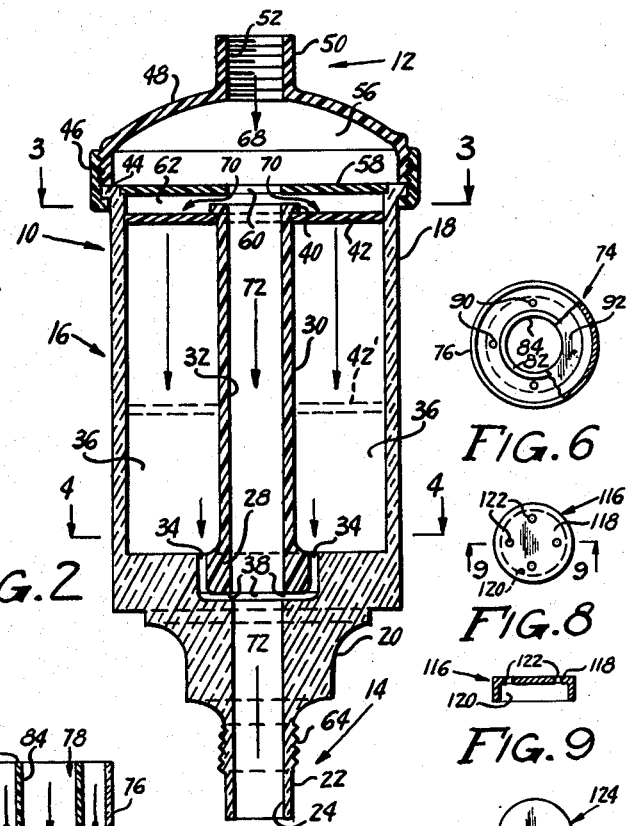
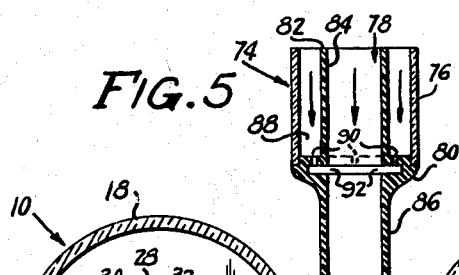
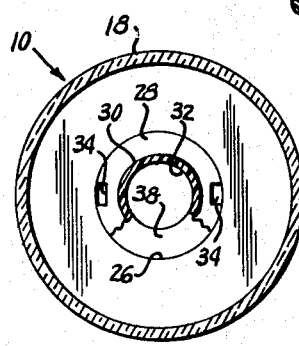
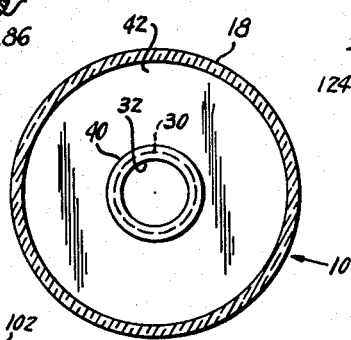
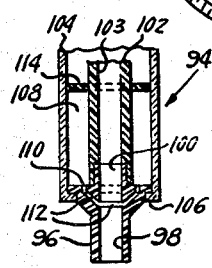
INVENTOR.
JOHN GALLO, SR.
BY
Kimmel & Crowell
ATTORNEYS.

3,182,860
DISPENSING DEVICE
John Gallo, Sr., 64 Broad St., Boston, Mass.
Filed Feb. 26, 1963, Ser. No. 260,970
7 Claims. (Cl. 222—136)

This invention relates to a dispensing device and has as its primary object the provision of a nozzle for dispensing paste-like substances having a core of one material or color and a thin peripheral shell of a different material or color.

Another object of this invention is the provision of a device of the character described which may be adapted for use with collapsible tubes, pressurized cans or similar receptacles wherein material of semi-solid or paste-like material, such as tooth paste, creams, food stuffs, chemicals, epoxy adhesives, or other materials of similar consistency may be dispensed.

A further object of this invention is the provision of a dispensing device for coating the entire periphery of an extrusion of paste-like material wherein the material to form the peripheral shell or coating is contained within the device itself and is extruded under the pressure of the core forming material.

A still further object of this invention is to provide such a dispensing device having a movable piston means continuously urged into extruding contact with a quantity of shell forming material contained within the device.

A further object of the invention is the provision of a dispensing device including means to form an extrusion having a solid core and a peripheral shell, wherein these means are replaceable with other means to provide a solid extrusion or an extrusion formed with a mixture of the core forming and shell forming materials.

Another object of this invention is the provision of a dispensing device to produce an extrusion having a core of one material and a shell of another, wherein the two materials are received by the device from separate storage compartments in a pressurized container, collapsible tube or the like.

Yet another object of this invention is to provide a device of the character described wherein an adapter may be secured to the outlet end to vary the shape of the extrusion and to produce a fancy design thereon such as stripes through the peripheral shell.

Other and further objects reside in the combinations of elements, arrangements of parts, and features of construction.

Still other objects will in part be obvious and in part be pointed out as the description of the invention proceeds and as shown in the accompanying drawings wherein:

FIGURE 1 is an elevational view of one form of dispensing device in accordance with the instant inventive concept, showing a portion of a receptacle for containing a core material in dotted lines and also showing an adapter secured over the outlet end of the device in dotted lines;

FIGURE 2 is an enlarged longitudinal cross-sectional view taken substantially on line 2—2 of FIGURE 1;

FIGURE 3 is a transverse cross-sectional view taken substantially on line 3—3 of FIGURE 2;

FIGURE 4 is a transverse cross-sectional view taken substantially on line 4—4 of FIGURE 2, with parts broken away for illustrative clarity;

FIGURE 5 is a longitudinal cross-sectional view to a smaller scale of another embodiment of a dispensing device in accordance with the instant inventive concept;

FIGURE 6 is a top plan view of the embodiment of FIGURE 5, partly in section for illustrative clarity.

FIGURE 7 is a fragmentary longitudinal cross-sectional view to a smaller scale of still a further embodiment of a dispensing device in accordance with this invention;

FIGURE 8 is a top plan view of a cup-shaped perforated piston for use particularly with the embodiment of FIGURE 7 to provide extrusions of mixed core forming and shell forming materials;

FIGURE 9 is a transverse cross-sectional view of the cup-shaped piston taken substantially on line 9—9 of FIG. 8;

FIGURE 10 is a top plan view of a solid piston for use particularly with the embodiment of FIG. 7 to provide extrusions entirely of shell forming material; and FIGURE 11 is a transverse cross-sectional view of the solid piston taken substantially on line 11—11 of FIG. 10.

Similar reference characters refer to similar parts throughout the several views of the drawing.

Referring now to the drawing in detail, and more particularly to FIGURES 1 to 4, one embodiment of the dispensing device of the instant invention is indicated generally by the reference numeral 10 and will be seen to have an inlet end 12 and an outlet end 14. The main body portion of the device 10 is indicated generally at 16 and is comprised basically of an outer substantially cylindrical member 18 having an open top and a closed bottom formed into an integral substantially frusto-conical member 20 terminating in nozzle element 22. A central bore 24 is formed through the frusto-conical portion 20 and the nozzle element 22 and communicates with the interior of the outer element 18. A counter bore 26 is defined concentric to the bore 24 and receives therein, in press-fit relationship, the bottom end 28 of an inner tube-like element 30 having a central bore 32 aligned with the bore 24 and being open at its upper and lower ends. Any number of apertures 34 (two being shown) are defined in the periphery of the lower end 28 of the inner element 30 communicating at their upper end with a shell forming material receiving chamber 36 formed between the inner and outer members 18 and 30, respectively, and communicating at their lower end with an annular groove 38 formed between the bottom of counterbore 26 and the lower end 28 of the inner element 30. Note particularly FIGURES 2 and 4.

The upper end of the inner element 30 has a peripheral flange 40 defined thereon forming a stop or upper limit for a piston means 42 in the form of a washer or the like slidingly received over the inner element 30 and within the outer element 18.

The upper end of the outer element 18 has a peripheral flange 44 defined thereon which receives a flanged coupling sleeve 46 for securing thereto an inlet adapter element 48 terminating in a substantially cylindrical inlet nozzle 50 which may be internally threaded as at 52 or may have other means (not shown) for securing and communicating with a receptacle for the core forming material such as a pressurized can, a collapsible tube or the like, a portion of which is indicated in dotted lines at 54 in FIGURE 1. The top of the outer element 18 may be maintained completely open and in communication with a receiving cavity 56 in the inlet adapter element 48 or a pressure distributing element 58 having a single central aperture 60 or a plurality of apertures (not shown) may be secured internally of the top end thereof to define a pressure chamber 62 immediately above the piston means 42.

The outlet nozzle 22 may be externally threaded as shown at 64 in FIGURE 2 to receive an adapter means 66 as shown in dotted lines in FIGURE 1 to produce an extrusion having a designed or fancy cross section or striped with portions of the core forming material showing through the peripheral shell.

It is to be understood that the inlet adapter element 48 and the outlet adapter means 66 may be of any conventional design and may be secured to the receptacle 54 and to the nozzle 22 in any way such as by internal threads, external threads or merely by a press fit.

The use and operation of the preferred embodiment of the dispensing device of the instant invention will now be apparent. The chamber 36 is filled with a paste-like substance for producing the peripheral shell and the inlet nozzle 50 is secured to the receptacle 54 containing a paste-like substance for producing the core of the extrusion. The core forming material enters the device in the direction of the arrow 68 in FIGURE 2 and fills the receiving chamber 56 passing through the aperture 60 in the pressure distributing element 58 in the direction of the arrows 70 to provide an extrusion pressure in the pressure chamber 62 against the rear of the piston means 42 to cause the same to slide downwardly toward the dotted position 42′ thereby expelling shell forming material through the apertures 34 and the annular recess 38. The remainder of the core forming material passes downwardly through the bore 32 in the inner element 30 in the direction of the arrows 72 to form a substantially cylindrical core. As the core passes the annular recess 38, a thin peripheral coating of the material within the chamber 36 is applied thereto and an extrusion is produced from the outlet of the nozzle 22. If an adapter means 66 has been secured over the outlet of the nozzle element 22, the shape of the extrusion will be changed accordingly. If the adapter means 66 has a plurality of points 67, such as the well-known star shape or other similar shapes, it will remove portions of the shell forming material to produce a striped effect on the extrusion.

It is apparent that any number of apertures 60 may be provided in the pressure distributing element 58 to facilitate equal distribution of the material of the core forming material against the upper end of the piston means 42. Likewise, any number, shape, or size of apertures 34 may be provided around the periphery of the bottom end 28 of the inner element 30 in order to insure a smooth continuous peripheral shell flowing from the annular recess 38.

In view of the fact that a relatively small amount of shell forming material is used to form the extrusion when compared to the quantity of core forming material required, a dispensing device which contains the shell forming material within itself, such as shown in the embodiment of FIGURES 1 to 4 is normally quite satisfactory. However, if the extrusion is to be continued for an extended period of time and if it is desired not to have to open the device to resupply the same with shell forming material, a dispensing device, such as shown in FIGURES 5 and 6, may be provided. In this form of the invention, an outer substantially cylindrical element 76 is secured to an inner element 78 at an outwardly extending integral portion 80. The element 78 has an inner substantially tube-like member 82 with an internal bore 84 and extends to form an outlet nozzle 86. A shell forming material receiving chamber 88 is defined between the inner and outer elements 76 and 78, respectively, and communicates with the bore 84 through a plurality of apertures 90 leading into an annular recess 92. A supply of shell forming material (not shown) may be disposed in communication with the chamber 88 and a separate supply of core forming material may be disposed in communication with the bore 84 so that a coated extrusion may be formed in a manner similar to the embodiment of FIGURES 1–4.

It is clear that with the modified form shown in FIGURES 5 and 6 any means of connecting the dispensing device to the supplies of paste-like material may be utilized and an adapter means, such as 66 shown in FIGURE 1, may be secured over the outlet nozzle 86 to form designed or striped extrusions.

A further embodiment of dispensing device in accordance with this invention is indicated generally at 94 in FIG. 7. A nozzle element 96 is internally bored at 98 and has an upstanding peripheral flange means at 100 on which is detachably supported an inner, substantially cylindrical member 102, having a longitudinal bore 103 forming a continuation of the bore 98 of the nozzle element 96. An outer substantially cylindrical member 104 is held in spaced relationship to the inner member 102 by cooperating flange means 106 to provide a shell forming material receiving cavity 108 therebetween. Apertures 110 communicate with an angular annular recess 112 to carry shell forming material into peripheral contact with the core forming material in the bore 98 in an obvious manner. The annular recess 112 is shown as being disposed at approximately a 45° angle to facilitate the forming of the shell and it is to be understood that it may have any angular relationship. A washer-type piston means 114 is provided in slidable relationship to the inner element 102.

It is to be understood that the upper end of the embodiment of FIGURE 7 may be secured in the manner of the device of FIGS. 1–4 to a source of core forming material and any conventional adapter means, such as 66 may be secured over the outlet end of the nozzle element 96. The use and operation of the device as shown in FIG. 7 will be substantially the same as the embodiment of FIGS. 1–4.

If desired, the inner member 102 and its associated piston means 114 may be removed and replaced with either the auxiliary piston means shown in FIGS. 8 and 9 or 10 and 11.

The auxiliary piston means indicated generally at 116 in FIGS. 8 and 9 is substantially cup-shaped and has a flat bottom member 118 and a depending flange means 120. A plurality of apertures 122 may be included through the bottom member 118 for a purpose to be described in detail hereinafter.

In FIGS. 10 and 11 an auxiliary piston means 124 is shown as a substantially solid disc. This embodiment may have apertures (not shown) if desired.

If either auxiliary piston means 116 or 124 without apertures is positioned within the outer member 104 of the embodiment of FIG. 7 and core forming material is provided from a source (not shown), the auxiliary piston means will act to extrude a solid element of shell forming material.

If an auxiliary piston means, such as 116 or 124 having apertures such as 122, is provided to replace the inner member 102 about 75% of the extrusion will be of shell forming material and about 25% will be of an irregular mixture of the core forming and the shell forming material, these quantities varying with the number, size, and shape of the apertures 122.

If an adapter means such as 66 is used with any of the modifications of FIGS. 7–11, a designed or irregularly striped extrusion will result.

It is obvious that no auxiliary piston means is necessary on removal of the inner member to provide a completely irregular extrusion of mixed core forming and shell forming materials. Also, the auxiliary piston means 116 and 124 are capable of use with the embodiment of FIGS. 1–4.

It is to be understood that although a device has been shown to provide a cylindrical extrusion that any shape extrusion, such as square or flattened or the like is contemplated.

It will now be seen that there is herein provided a dispensing device which satisfies all of the objectives of the instant invention and others, including many advantages of great practical utility and commercial importance.

Since many embodiments may be made of the instant inventive concept, and since many modifications may be made in the embodiments hereinbefore shown and described, it is to be understood that all matter herein is to be interpreted merely as illustrative, and not in a limiting sense.

I claim:

1. A dispensing device for producing an extrusion having a core formed of one paste-like material and a peripheral shell formed of another paste-like material comprising, an inner member having a longitudinal bore defined therein including an inlet end and an outlet end,
said bore receiving the core forming material at said inlet end,
an outer member having a longitudinal bore therein, there being a shell forming material receiving chamber defined between said inner member and said outer member,
piston means in said chamber slidably received over said inner member,
an inlet adapter element removably secured to said outer member defining a core forming material receiving cavity in communication with said inlet end of said inner member,
inlet means carried by said adapter element for securing said device to a receptacle providing a source of supply for said core forming material,
said core forming material receiving cavity being also in communication with said piston means whereby when core forming material is received in said inlet means a portion of such material passes through said inner member to form the core and the remainder portion of such material provides pressure for said piston means for extruding said shell forming material,
and a nozzle means having a longitudinal bore including an inlet end and an outlet end,
said nozzle means inlet end being in communication with said cavity and said chamber, said extrusion being produced at said outlet end of said nozzle means.

2. The dispensing device according to claim 1 in which a pressure distributing element having at least one aperture is secured within said core forming material receiving cavity between said piston means and said inlet means.

3. The apparatus according to claim 2 including a nozzle adapter removably secured to said nozzle means outlet end, said nozzle adapter being operable to selectively vary the design of the extrusion when extruded.

4. The apparatus according to claim 3 wherein said nozzle adapter has means defining an aperture therein, said last named means including a plurality of spaced points whereby spaced portions of said shell are removed during extrusion of said shell to provide stripes on said extrusion when extruded.

5. The apparatus according to claim 3 in which said nozzle means has an annular recess in communication with said chamber.

6. The apparatus according to claim 5 in which said annular recess is connected in communication with said chamber by downwardly slanting apertures.

7. The apparatus according to claim 6 in which the slant of said apertures in said nozzle means is at approximately 45° with respect to the longitudinal axis of said nozzle means.

References Cited by the Examiner

UNITED STATES PATENTS

| | | | |
|---|---|---|---|
| 526,741 | 10/94 | Rees | 222—193 |
| 1,051,171 | 1/13 | Stevenson | 222—135 X |
| 1,639,699 | 8/27 | Hopkins | 222—94 |
| 2,510,269 | 6/50 | Winter | 222—135 X |
| 2,736,466 | 2/56 | Rodth | 222—136 |
| 2,914,220 | 11/59 | Marraffino | 222—94 |
| 2,925,939 | 2/60 | Spero | 222—145 |
| 2,944,704 | 7/60 | Taylor | 222—94 |
| 2,947,449 | 8/60 | Hernandez | 222—136 X |
| 2,973,883 | 3/61 | Madderno | 222—136 X |
| 3,110,423 | 11/63 | Hegedic et al. | 222—145 X |

FOREIGN PATENTS

| | | |
|---|---|---|
| 553,068 | 5/43 | Great Britain. |
| 570,984 | 2/59 | Canada. |

RAPHAEL M. LUPO, *Primary Examiner.*

LOUIS J. DEMBO, *Examiner.*